United States Patent [19]

Ajmera

[11] Patent Number: 4,883,631
[45] Date of Patent: Nov. 28, 1989

[54] HEAT SET METHOD FOR OVAL CONTAINERS

[75] Inventor: Prakash R. Ajmera, Toledo, Ohio

[73] Assignee: Owens-Illinois Plastic Products Inc., Toledo, Ohio

[21] Appl. No.: 188,092

[22] Filed: Apr. 27, 1988

Related U.S. Application Data

[63] Continuation of Ser. No. 909,800, Sep. 22, 1986, abandoned.

[51] Int. Cl.[4] .................. B29C 35/16; B29C 49/06; B29C 49/08; B29C 49/18
[52] U.S. Cl. .................................. 264/528; 264/28; 264/237; 264/348
[58] Field of Search ............ 264/28, 528, 235, 237, 264/346, 348, 520, 521, 526, 523; 425/526

[56] References Cited

U.S. PATENT DOCUMENTS

| Re. 28,497 | 7/1975 | Gasmire | 264/28 |
|---|---|---|---|
| 3,089,185 | 5/1963 | Settembrini | 264/528 |
| 3,421,179 | 1/1969 | Waiwurm | 264/528 |
| 3,450,805 | 6/1969 | Chesser | 264/28 |
| 4,039,641 | 8/1977 | Collins | 264/28 |
| 4,091,059 | 5/1978 | Ryder | 264/528 |
| 4,115,494 | 9/1978 | Valyi | 264/535 |
| 4,188,357 | 2/1980 | Go | 264/540 |
| 4,244,913 | 1/1981 | Ryder | 264/528 |
| 4,246,225 | 1/1981 | Ninneman | 264/348 |
| 4,385,089 | 5/1983 | Bonnebat et al. | 264/528 |
| 4,476,170 | 10/1984 | Jabarin | 428/35 |
| 4,512,948 | 4/1985 | Jabarin | 264/521 |
| 4,522,779 | 6/1985 | Jabarin | 264/530 |
| 4,524,045 | 6/1985 | Hayashi et al. | 264/535 |
| 4,636,349 | 1/1987 | MacLaughlin | 264/28 |

FOREIGN PATENT DOCUMENTS

2405809  6/1979  France .................. 264/528

*Primary Examiner*—Jan H. Silbaugh
*Assistant Examiner*—Karen D. Kutach

[57] ABSTRACT

A method and apparatus for making a partially crystalline, biaxially oriented heat set hollow plastic container from a hollow parison having an open end and a closed end including engaging the open end of a plastic parison which is at a temperature within its molecular orientation temperature range, enclosing the hot parison in a hot mold, which is at heat setting temperature, expanding the plastic parison within the hot mold by internal pressurization to induce biaxial orientation of the plastic parison and to induce partial crystallization in the biaxially oriented container, exhausting the blow molding fluid while continuously introducing a cooling fluid such as liquid carbon dioxide into the biaxially oriented container and continuously removing the cooling fluid while the hot mold is closed for a period of time, opening the hot mold while continuing to introduce, circulate and remove coolant fluid for a predetermined period of time until the container is cooled sufficiently to prevent significant shrinkage and finally releasing the container.

28 Claims, 5 Drawing Sheets

HEAT SET METHOD FOR OVAL CONTAINERS

This application is a continuation of application Ser. No. 909,800, filed Sept. 22, 1986 now abandoned.

This invention relates to making hollow biaxially oriented heat set partially crystalline articles and particularly articles made of poly(ethylene) terephthalate.

BACKGROUND AND SUMMARY OF THE INVENTION

It has heretofore been known that the thermal stability and barrier properties of oriented blow molded containers of poly(ethylene) terephthalate are significantly increased by heat setting. Typical processes for heat setting are shown in U.S. Pat. Nos. 4,476,170, 4,512,948 and 4,522,779.

In U.S. Pat. Nos. 4,476,170 and 4,512,948, there is disclosed an article and a process of making an oriented and heat set blow molded container of poly(ethylene) terephthalate. In the process, a preform preheated to a temperature suitable for orientation is biaxially stretched in a blow mold and then while the hollow container is still in contact with the blow mold walls, the article is raised to a higher heat setting temperature preferably in the range of 200°–250° C. (except for the neck) thus heat setting the container, and while the container is still at a shrinkage resisting pressure exceeding atmospheric, it is cooled in the same mold to a temperature at which it maintains its shape when not pressurized but not below 100° C. It is also particularly disclosed that this cooling step can be done in the air outside the mold while maintaining internal pressure. According to these patents, when the heat setting temperature of the hot mold ranges from 220°–250° C. and the quenching temperature is not below 100° C., higher onset-of-shrinkage temperatures are obtained.

In U.S. Pat. 4,522,779, there are disclosed improved plastic containers and a process for their production. In the first embodiment, a container is blow molded in a first hot blow mold, then reblown to a larger size in a second cold mold of larger volume than the first hot mold. Such containers are stated as having improved physical properties, particularly very high hoop yield stresses. However, the utilization of a larger volume cold mold substantially reduces the thermal stability. In the second embodiment, a container is blow molded in a hot blow mold, then reblown to a larger size in a second hot blow mold where it is blown to the confines of the second mold and the container is then removed from the second hot mold and transferred to a third cold mold and cooled to room temperature while maintaining internal pressure. In a further embodiment, the container is blow molded in a first hot mold, reblown in a second hot mold, and thereafter the second mold is cooled to cool the container.

U.S. Pat. 4,385,089 (British Patent Specification No. 1,604,203) is directed to heat set biaxially oriented hollow articles and states that the preform or parison should be heated at least to biaxially oriented temperature and maintained in close contact with a hot mold which is at a temperature of up to 40° C. above the minimum oriented temperature. In one embodiment, the resultant molded hollow article is moderately cooled causing a temperature drop of 10°–30° C. by introducing cooling vapor or mist into the hollow article, interrupting the cooling vapor, and opening the mold. In another embodiment, the heat set article is allowed to shrink freely and then reblown in the same hot mold or in a separate cooled mold. The patent calls for a heat setting temperature of 40° C. above the orientation temperature limits thermal stability and barrier properties from heat setting.

According to this patent, the temperature of the hot mold should be maintained between 30° and 50° C. above the minimum orientation temperature of the plastic material. Otherwise, it is stated there are numerous disadvantages including lowering of the production rate, the danger of the appearance of major distortion and major shrinkage on mold release, the disadvantage inherent in heating metal molds to very high temperatures and keeping them at such temperatures, and the danger of crystallization which would cause a loss of transparency. Further, in accordance with this prior patent, excessive shrinkage is to be avoided and generally the temperature drop of 10° to 30° C. should be made. Accordingly, such a method precludes obtaining a degree of heat setting which would produce thermal stability at higher temperatures as may be required in filling the container with various products. In addition, such a method will preclude obtaining the higher degrees of crystallinity and resultant high barrier properties which are required for some products.

U.S. Pat. No. 4,039,641 discloses a process for producing a heat set biaxially oriented poly(ethylene) terephthalate bottle filled with a liquid wherein a parison is expanded in a mold which is at a temperature in the range of 130° to 220° C. and maintained in contact with the mold by a gas such as pressurized carbon dioxide and the crystallized bottle is cooled by displacing the pressurizing gas with a cooling liquid which is cooled to about 0° to 5° C. The liquid may be liquid to be packaged in the container. Such a method substantially reduces the cycle time because of the need to introduce the liquid and thereafter remove the liquid, in the case where the liquid is not that to be packaged in the container. Moreover, utilizing a liquid within the container to cool the container limits the amount of heat that can be extracted from the container because it has a low coefficient of heat transfer. Furthermore, the low coefficient of heat transfer takes a longer time to extract the heat. In addition, filling the container with a finite amount of liquid equal to the volume of the container limits the amount of heat which can be extracted from the container to the amount of heat that can be transferred to this finite amount of liquid.

U.S. Pat. RE. No. 28,497 discloses a method and apparatus for reducing mold cycle time in a conventional blow molding method wherein a heated parison is expanded by a gas such as gaseous carbon dioxide in a blow mold and thereafter subsequently internally chilled by a liquid carbon dioxide. The article is cooled until it is self-sustaining, the article is vented to atmospheric pressure, the mold is opened, and the article is removed from the mold. The patent does not relate to biaxially oriented articles or heat setting of biaxially oriented articles.

None of the prior art recognizes or teaches that it is necessary to continue the cooling by circulating liquid carbon dioxide after the mold is opened in order to obtain self-sustaining biaxially oriented heat set containers, as in the present invention.

Accordingly, among the objectives of the present invention are to provide a method and apparatus for making partially crystalline, biaxially oriented heat set hollow plastic containers which has a significantly lower cycle time; which permits heat set containers to be made that have complex configurations including oval containers; which involves low capital investment; which is easy to maintain; and which involves the use of lower cost tooling.

In accordance with the invention, the method and apparatus for making a partially crystalline, biaxially oriented heat set hollow plastic container from a hollow parison having an open end and a closed end comprising engaging the open end of a plastic parison which is at a temperature within its molecular orientation temperature range, enclosing the hot parison in a hot mold, the mold being at heat setting temperature, expanding the plastic parison within the hot mold by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, exhausting the blow molding fluid while continuously introducing a cooling fluid such as liquid carbon dioxide into the biaxially oriented container and continuously removing the cooling fluid from the container while the hot mold is closed for a period of time, opening the hot mold while continuing to introduce, circulate and remove coolant fluid for a predetermined period of time until the container is cooled sufficiently to prevent significant shrinkage and finally releasing the container.

DESCRIPTION

Figure 1:
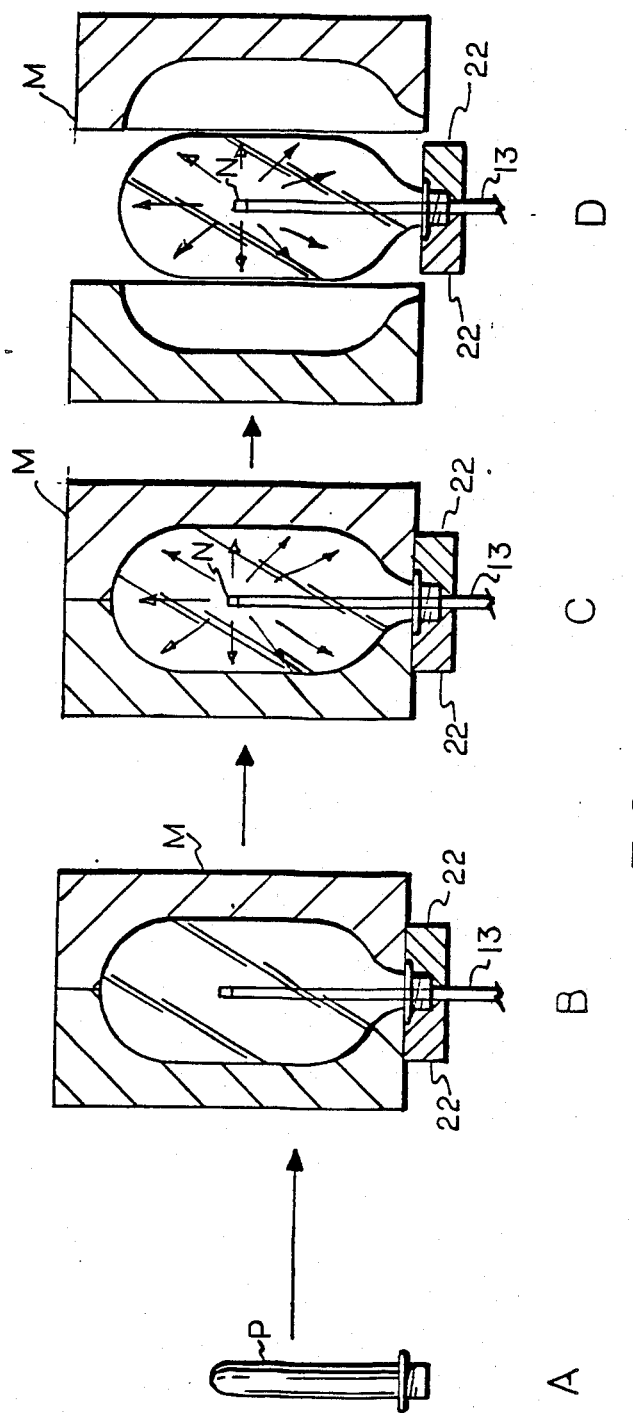
FIG. 1 is a diagrammatic view showing of the successive steps in the method embodying the invention.

Referring to FIG. 1, the method for making a partially crystalline, biaxially oriented heat set hollow plastic container from a hollow parison having an open end and a closed end comprises engaging the open end of a plastic parison P by a neck clamp which has been heated (step A) at a temperature within its molecular orientation temperature range, enclosing the hot parison in a hot mold M, the mold being at heat setting temperature, expanding the plastic parison within the hot mold M by internal pressurization to induce biaxial orientation of the plastic parison and force the plastic parison into intimate contact and conformance with the hot mold M and to maintain contact by such internal pressurization between the mold M and the biaxially oriented container for a time sufficient to induce partial crystallization in the biaxially oriented container (step B), exhausting the blow molding fluid while continuously introducing a cooling fluid such as liquid carbon dioxide into the biaxially oriented container while continuously circulating and continuously removing the cooling fluid from the container, while the hot mold is closed for a period of time (step C), opening the hot mold while continuing to introduce cooling fluid and while continuously circulating and continuously removing the cooling fluid from the container for a predetermined period of time until the container is cooled sufficiently to prevent significant shrinkage (step D) and finally releasing the container.

It has been found to be important to introduce the cooling fluid medium such that it is applied over the entire inner surface of the container, except possibly for the finish, and preferably uniformly so that adequate cooling is achieved. Thus, the position of the nozzle through which the cooling medium is introduced is important as well as the construction of the nozzle.

Figure 2:
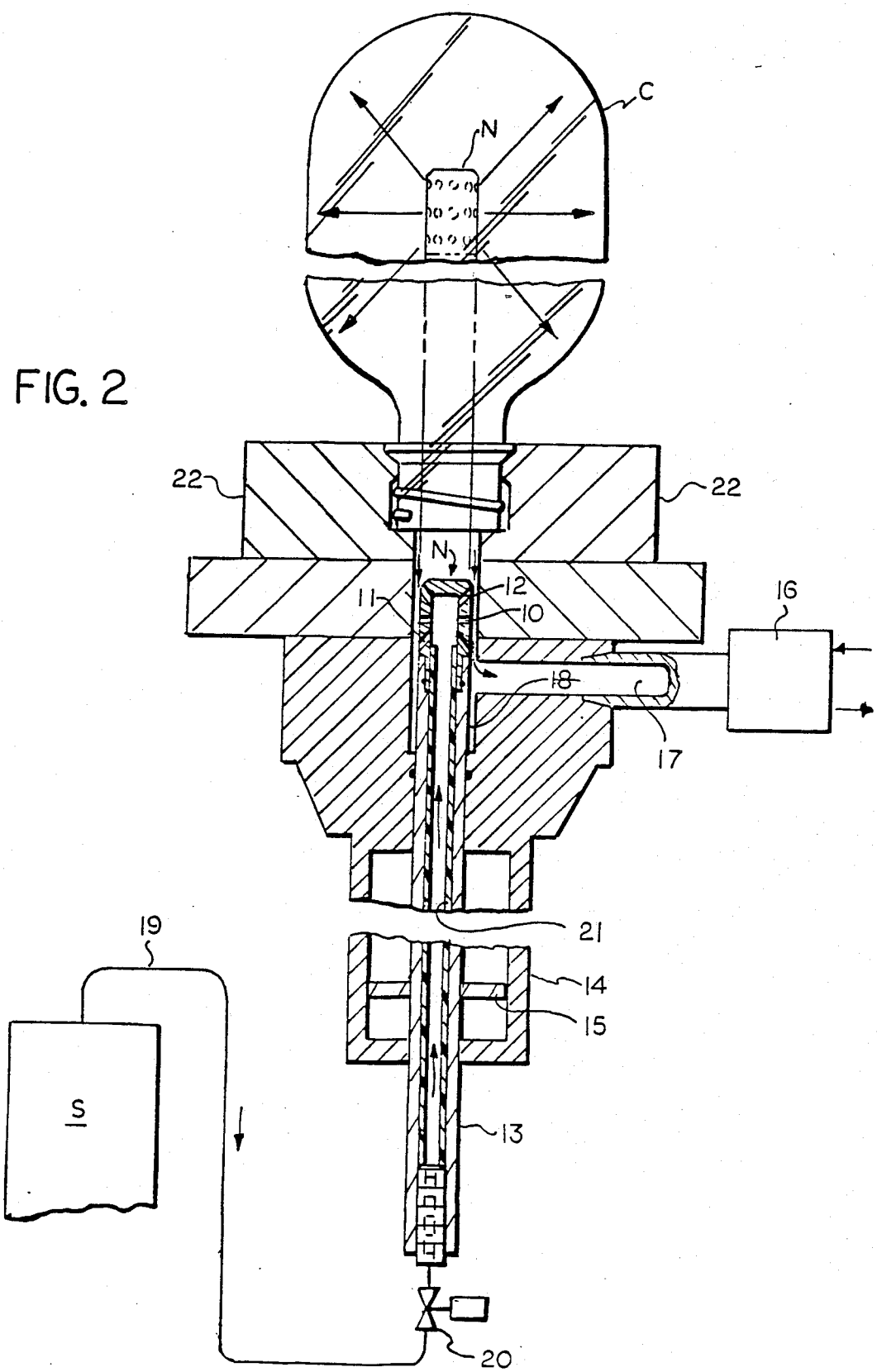
FIG. 2 is a partly schematic view of a portion of an apparatus utilized with the method.
Figure 3:
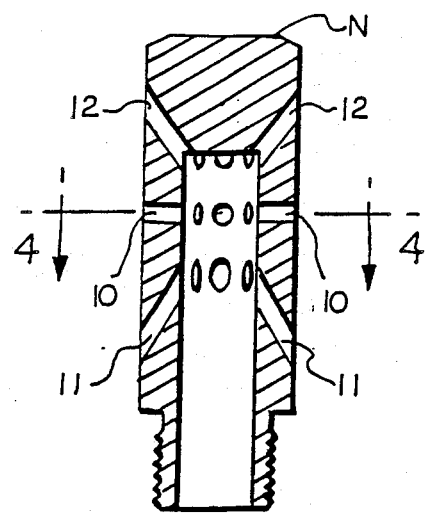
FIG. 3 is an enlarged sectional view of a nozzle utilized in the apparatus.
Figure 4:
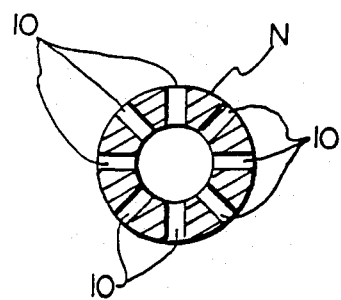
FIG. 4 is a sectional view taken along the line 4—4 in FIG. 3.

Referring to FIGS. 2, 3, 4, a preferred nozzle N comprises a first plurality of circumferentially spaced orifices 10 that extend radially, a second set of circumferentially spaced orifices 11 that extend downwardly radially and axially toward the neck of the container C and a third set of circumferentially spaced orifices 12 that extend radially and axially in an axial direction toward the base of the container.

Referring to FIG. 2, the nozzle N is positioned on a hollow stretch rod 13 which is adapted to be moved within the mold through the neck forming portion of the mold by operation of a cylinder 14 cooperating with a piston 15 on the rod 13. Blowing pressure is provided through a three way valve 16 for supplying blowing fluid such as air or nitrogen through passage 17 to the space 18 about the hollow rod 13 and nozzle N to blow the parison P and form the container C. At this time, the nozzle N is moved to the desired position within the container C. Alternatively, the nozzle N may be used at the end of rod 13 as a stretch rod to stretch the parison axially prior to introducing the blowing fluid or simultaneously with introducing the blowing fluid after which the rod is retracted to bring the nozzle N to the desired position within the container C for cooling the container C. The blowing fluid is first applied at a lower pressure, for example, 70 to 200 p.s.i., and then the blowing fluid is applied at a higher pressure, for example, 150 to 350 p.s.i., to maintain contact of the container with the surface of the mold. After the completion of the crystallization or heat setting time, the valve 16 is activated to exhaust the blowing fluid through passage 17 to the atmosphere. The cooling fluid such as carbon dioxide is provided from a source S through a line 19 and solenoid operated valve 20 to the passage in the hollow rod 13 and nozzle into the blown container C and is exhausted continuously about the periphery of the nozzle N through passage 17. A plastic tube 21 of nylon or the like is provided on the interior of rod 13 to minimize the freezing or blockage of the passage in the hollow rod 13.

As used herein, cooling medium comprises liquid carbon dioxide, liquid nitrogen, or combined mixture of water vapor and sub-zero temperature air. A preferred cooling medium comprises liquid carbon dioxide which is introduced at super atmospheric pressures and expands from the openings or orifices in the nozzle N, utilizes the combination of the temperature differential between the container and the carbon dioxide and the latent heat of evaporation of carbon dioxide from either its liquid or solid state to its gaseous state in the lower pressure existing in the container. During the cooling, the pressure within the container is slightly greater than atmospheric.

If the cooling medium is combined water mist and sub-zero air, passage through the openings of a nozzle N will also result in expansion and facilitate cooling by first forming a solid state of snow or ice followed by evaporation to the gaseous state. If the cooling medium is liquid nitrogen, the heat transfer or cooling action is by heat transfer due to latent heat evaporation from the liquid to the gaseous state followed by temperature differential between the gaseous state and the container.

In operation, the steps comprise:
  engaging the open end of a plastic parison P which has been heated (step A) at a temperature within its molecular orientation temperature range,
  enclosing the hot parison in a hot mold M, the mold being at heat setting temperature,
  expanding the plastic parison within the hot mold M by internal pressurization to induce biaxial orientation of the plastic parison and force the plastic parison into intimate contact and conformance with the hot mold M and to maintain contact by such internal pressurization between the mold M and the biaxially oriented container for a time sufficient to induce partial crystallization in the biaxially oriented container (step B),
  exhausting the blow molding fluid while continuously introducing a cooling fluid such as liquid carbon dioxide into the biaxially oriented container while continuously circulating and continuously removing the cooling fluid from the container, while the hot mold is closed for a period of time (step C),
  opening the hot mold while continuing to introduce coolant fluid while continuously circulating and continuously removing the cooling fluid from the container for a predetermined period of time until the container is cooled sufficiently to prevent significant shrinkage (step D) and
  finally releasing the container (step D).

Figure 7:
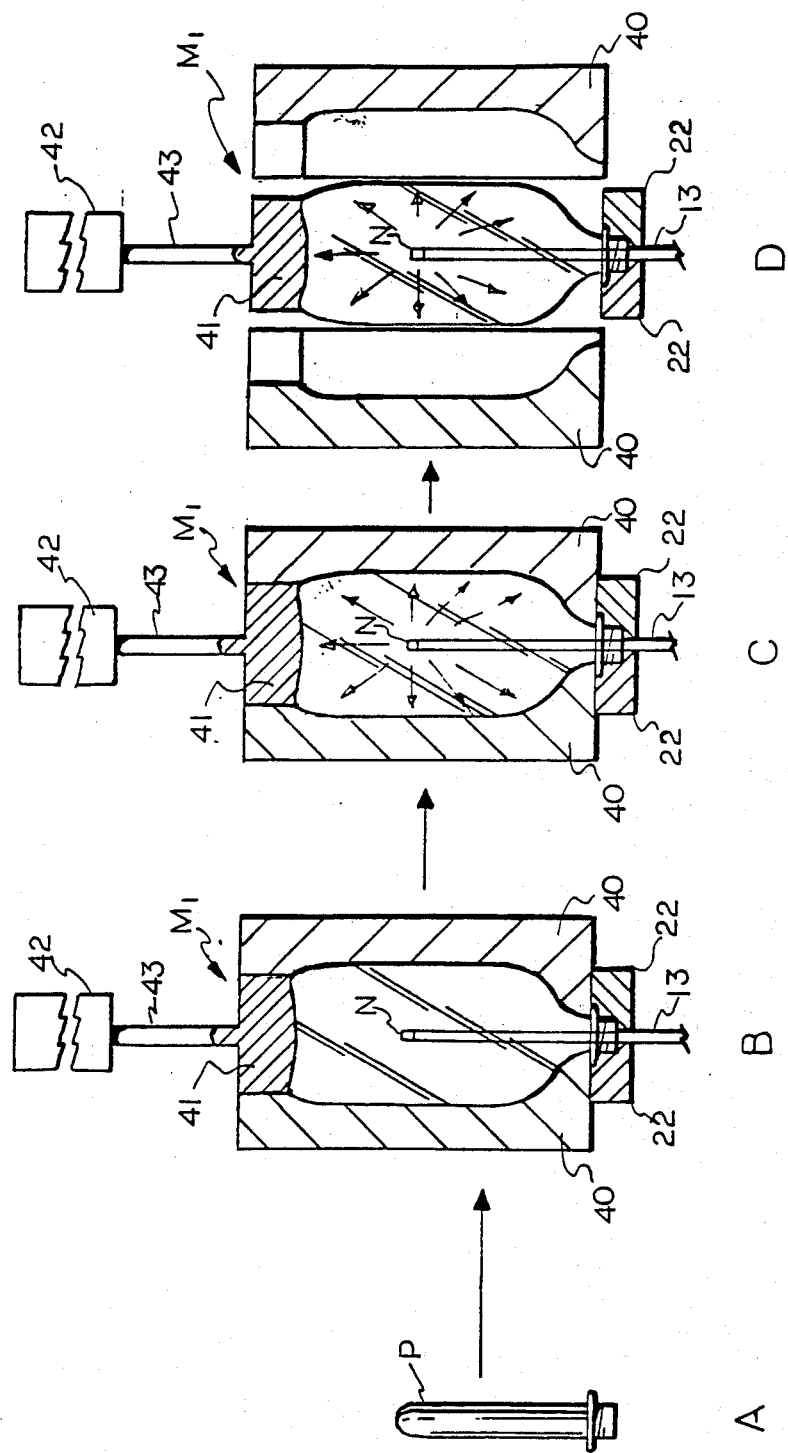
FIG. 7 is a diagrammatic view of the successive steps in a modified method embodying the invention.

In the form of method shown in FIG. 7, the mold $M_1$ is a three sectional mold comprising mold sections 40 which close about a mold base section 41. The mold base section 41 is configured to form the bottom of the container. In this method, the mold base is movable axially by a fluid cylinder 42 through a piston rod 43 so that when the mold $M_1$ is opened and the cooling fluid is continuously introduced into the container, circulated and continuously removed or exhausted, the base of the container is held in position by the mold base section 41 of the mold as shown at station D in FIG. 7. After the completion of the introduction of the coolant fluid, the mold base section 41 is retracted axially outwardly and the container is released by opening the neck clamp 22.

This method of using a movable base section has particular utility where the container base has a configuration such that the resultant container is free standing.

It can thus be seen that the introduction of carbon dioxide or similar cooling fluid functions to reduce the average temperature of the container while the mold is closed. When the mold is opened, the positive pressure of the continuously flowing carbon dioxide not only prevents the container from collapsing but, in addition, continues the cooling of the container from the interior and thereby continues to reduce the average temperature of the container until it achieves a self-sustaining condition. Where the heat setting temperature is on the order of 200° C. or higher, the average temperature of the container upon opening of the mold is necessarily higher, and if the positive pressure of the carbon dioxide and the time of cooling continues for an excessive period of time, there is a possibility that the container may slightly grow in volume. In order to obviate such growth, if it is necessary, the time of application of the carbon dioxide after opening of the mold may need to be reduced and controlled so that the cooling continues until the container is self-sustaining and is terminated before any undesirable growth is achieved. A further reason for minimizing the cooling time is that otherwise the cycle time is increased and the consumption of cooling fluid is substantially increased, thereby adversely affecting productivity and costs. It should be understood that the growth or expansion in volume in any event is minimal and the above considerations are applicable only where it is desired that the container have substantially no change in volume from that of the blown container.

The process of the present invention is applicable to polymers which are capable of being biaxially oriented when blown at orientation temperatures and subsequently heat set at higher heat setting temperatures to make the resultant hollow article thermally stable and provide improved barrier properties.

The process of the present invention, as well as the product, is especially concerned with polymers of poly(ethylene) terephthalate having an inherent viscosity of at least 0.6. Poly(ethylene) terephthalate polymers useful in the present invention include repeating ethylene terephthalate units with the remainder being minor amounts of ester-forming components and copolymers of ethylene terephthalate wherein up to about 10 mole percent of the copolymer is prepared from the monomer units selected from butane-1,4-diol; diethylene glycol; propane-1,3-diol; poly tetramethylene glycol); poly ethylene glycol); poly(propylene glycol); 1,4-hydroxymethylcyclohexane and the like, substituted for the glycol moiety in the preparation of the copolymer, or isophthalic; naphthalene 1,4- or 2,6-dicarboxylic; adipic; sebacic; decane-1,10-dicarboxylic acids, and the like, substituted for up to 10 mole percent of the acid moiety (terephthalic acid) in the preparation of the copolymer.

Of course, the poly(ethylene) terephthalate polymer can include various additives that do not adversely affect the polymer. For instance, some such additives are stabilizers, e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the poly(ethylene) terephthalate.

The process is also applicable to multilayer parisons comprising an orientable heat settable polymer and other polymers which provide desirable barrier properties wherein the orientable heat settable polymer comprises a major portion of the total weight, preferably at least 70%. Typical examples are multilayer parisons of poly(ethylene) terephthalate and copolyester; poly(ethylene) terephthalate, nylon and copolyester; poly(ethylene) terephthalate, adhesive, nylon, glue and poly(ethylene) terephthalate.

The process is also applicable to blends of poly(ethylene) terephthalate with polymers which provide desirable barrier properties wherein the poly(ethylene) terephthalate comprises a major portion of the total weight, preferably at least 70% of the total weight.

Thus, as used herein in the specification and claims, the term poly(ethylene) terephthalate is intended to include the above poly(ethylene) terephthalate containing materials.

The following parameters produce satisfactory results for poly(ethylene) terephthalate:

| | |
|---|---|
| Orientation temperature | 80–110° C. |
| Heat setting temperature | 120–250° C. |
| Heat setting time | 0.5–10 sec. |
| Total cooling time | 1.0–10 sec. |
| Mold open delay | 0.5–9.5 sec. |

A preferred range of parameters comprises a heat setting temperature which ranges between 180° to 230° C., a heat setting time ranging between 1 and 5 seconds, mold open delay ranging between 0.5 to 5 seconds, and cooling after mold opening ranging between 0.8 and 1.2 seconds.

The present invention has particular utility for making complex containers such as containers that are non-cylindrical, for example, oval in cross section, which may comprise two or more cylindrical portions of different cross sectional dimensions, and which incorporate combinations of cylindrical portions, inclined portions, flutes, ribs and the like.

Figure 5:
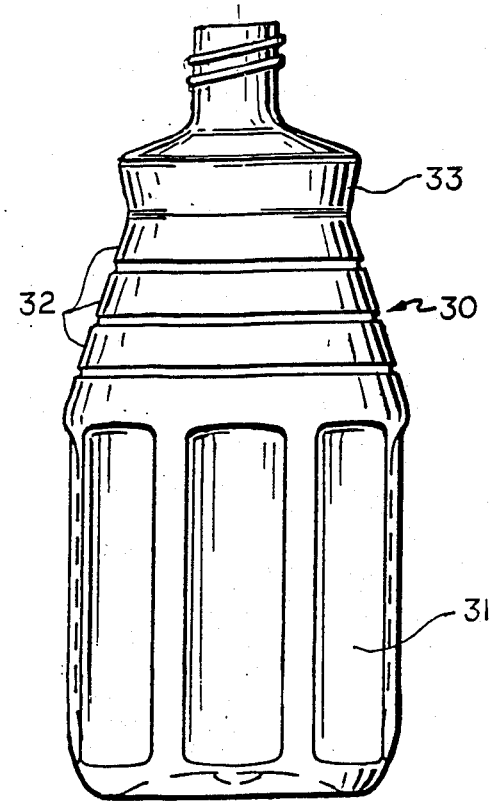
FIG. 5 is an elevational view of a container which may be made in accordance with the invention.
Figure 6:
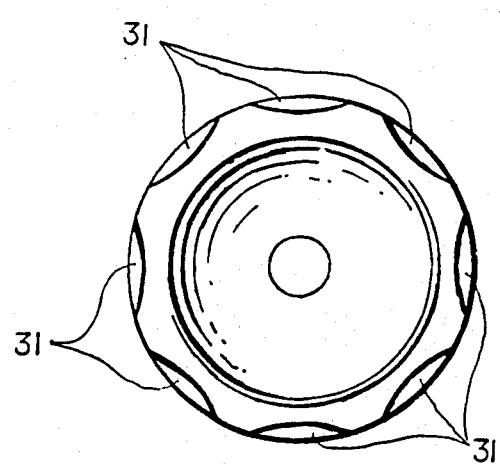
FIG. 6 is a bottom view of the container shown in FIG. 5.

Referring to FIGS. 5 and 6, for example, such containers 30 comprise eight vertical flutes 31, three horizontal frusto-conical ribs 32, add a reverse frusto-concial shoulder portion 33.

In the following test results, the containers had the configuration shown in FIGS. 5 and 6 and exhausting of blowing fluid and introduction of cooling were initiated simultaneously. The mold opening delay time was measured from the beginning of the exhaust and introduction of cooling fluid. The bottom temperatures of the molds were lower in order that there would be less heat setting of the thicker bottom of the container.

In the following test results, the containers were made from poly(ethylene) terephthalate having an I.V. of 0.80. The axial stretch ratio was 1.6X and hoop stretch ratio ranged from 4.8X to 5.3X in the area of flutes 31; ranged from 3.4X to 5.3X in the area of ribs 32; ranged from 3.4X to 3.66X in shoulder portion 33.

In connection with showing how the importance of positioning of the nozzle is in making complex containers, tests were conducted by making containers shown in FIGS. 5 and 6 having a height of 9½ inches and a satisfactory overflow container volume without shrinkage being about 1490 cc.

The following TABLE A summarizes the results:

TABLE A

| Bottle Number | Nozzle Location | | | |
|---|---|---|---|---|
| | 1A | 2A | 3A | 4A |
| Crystallization | | | | |
| Temp, °C. | 224 | 224 | 224 | 224 |
| Time, Sec. | 6 | 6 | 6 | 6 |
| Bottom Temp, °C. | 122 | 122 | 122 | 122 |
| Mold Open Delay, Sec. | 4 | 4 | 4 | 4 |
| $CO_2$ On Time, Sec. | 5 | 5 | 5 | 5 |
| Nozzle Location, Distance From Bottom, Inch | 2 | 2½ | 3 | 3½ |
| Overflow Vol., CC | 1475.7 | 1481.0 | 1476.0 | 1478.5 |

It can be seen that when the nozzle location is between 2 and 3½ inches from the bottom, satisfactory containers with good definition and reduced post mold shrinkage (overflow volume) were obtained. Thus, it is necessary to construct and position the nozzle so that the cooling medium cools all portions of the containers.

TABLE B summarizes a series of tests of containers made with varying mold open delay and carbon dioxide cooling times.

TABLE B

| Bottle Number | 1B | 2B | 3B | 4B |
|---|---|---|---|---|
| Crystallization | | | | |
| Temp, °C. | 228 | 228 | 228 | 228 |
| Time, Sec. | 5 | 5 | 5 | 5 |
| Bottom Temp, °C. | 122 | 122 | 122 | 122 |
| Mold Open Delay, Sec. | 3 | 3 | 3 | 2 |
| $CO_2$ On Time, Sec. | 4.2 | 3.8 | 3.5 | 2 |
| Nozzle Location, Distance From Bottom, Inch | 3 | 3 | 3 | 3 |
| Overflow Vol., CC | 1509.6 | 1486.2 | 1477.2 | 1385.6 |
| Bottle Number | 5B | 6B | 7B | 8B |
| Crystallization | | | | |
| Temp, °C. | 228 | 228 | 228 | 228 |
| Time, Sec. | 5 | 5 | 5 | 5 |
| Bottom Temp, °C. | 122 | 122 | 122 | 122 |
| Mold Open Delay, Sec. | 2 | 2 | 2 | 1.5 |
| $CO_2$ On Time, Sec. | 3 | 2.8 | 2.5 | 2.5 |
| Nozzle Location, Distance From Bottom, Inch | 3 | 3 | 3 | 3 |
| Overflow Vol., CC | 1476.4 | 1478.5 | 1436.1 | 1480.1 |
| Bottle Number | 9B | 10B | 11B | 12B |
| Crystallization | | | | |
| Temp, °C. | 228 | 228 | 228 | 228 |
| Time, Sec. | 5 | 5 | 5 | 5 |
| Bottom Temp, °C. | 122 | 122 | 122 | 122 |
| Mold Open Delay, Sec. | 1.5 | 1.5 | 1.0 | 1.0 |
| $CO_2$ On Time, Sec. | 2.3 | 2.0 | 2.0 | 1.8 |
| Nozzle Location, Distance From Bottom, Inch | 3 | 3 | 3 | 3 |
| Overflow Vol., CC | 1475.1 | 1445.6 | 1491.1 | 1476.3 |
| Bottle Number | 13B | 14B | 15B | 16B |
| Crystallization | | | | |
| Temp, °C. | 228 | 228 | 228 | 228 |
| Time, Sec. | 5 | 5 | 5 | 5 |
| Bottom Temp, °C. | 122 | 122 | 122 | 122 |
| Mold Open Delay, Sec. | 1.0 | 0.8 | 0.8 | 0.8 |
| $CO_2$ On Time, Sec. | 1.6 | 1.6 | 1.4 | 1.8 |
| Nozzle Location, Distance From Bottom, Inch | 3 | 3 | 3 | 3 |
| Overflow | | | | |

TABLE B-continued

| Vol., CC | 1463.0 | 1473.2 | 1432.1 | 1490.4 |
|---|---|---|---|---|

It can be seen from TABLE B, bottle number 4B, that where the mold opening delay and cooling times are the same, the resultant container is grossly collapsed. Moreover, where the difference between mold opening delay time and carbon dioxide application time is less than 0.5 second, collapsing or definition loss occurs, as shown in bottle numbers 4B, 7B, 10B. In the case of bottle 15B, the combination of the mold opening delay and cooling times was not adequate to cool the container to the self-supporting condition. This can be remedied by decreasing the mold opening delay time, as shown in bottle number 11B, compared with bottle number 10B, or bottle number 8B as compared to bottle number 7B. Alternatively, the cooling time can be increased as shown in bottle numbers 14B and 16B compared with bottle number 15B. The remaining containers were satisfactory within the definition of desired overflow volume and general appearance.

TABLE C represents a series of tests wherein mold opening delay and $CO_2$ application time are the same at various heat setting or crystallization temperatures.

TABLE C

| Bottle Number | 1C | 2C | 3C | 4C |
|---|---|---|---|---|
| Crystallization | | | | |
| Temp, °C. | 149 | 149 | 149 | 177 |
| Time, Sec. | 2.5 | 2.5 | 2.5 | 2.5 |
| Bottom Temp, °C. | 122 | 122 | 122 | 122 |
| Mold Open Delay, Sec. | 2 | 3 | 4 | 2 |
| $CO_2$ On Time, Sec. | 2 | 3 | 4 | 2 |
| Nozzle Location, Distance From Bottom, Inch | 3 | 3 | 3 | 3 |
| Overflow Vol. CC | 1366.3 | 1408.0 | 1408.0 | 1362.6 |

| Bottle Number | 5C | 6C | 7C | 8C | 9C |
|---|---|---|---|---|---|
| Crystallization | | | | | |
| Temp, °C. | 177 | 177 | 205 | 205 | 205 |
| Time, Sec. | 2.5 | 2.5 | 2.5 | 2.5 | 2.5 |
| Bottom Temp, °C. | 122 | 122 | 122 | 122 | 122 |
| Mold Open Delay, Sec. | 3 | 4 | 2 | 3 | 4 |
| $CO_2$ On Time, Sec. | 3 | 4 | 2 | 3 | 4 |
| Nozzle Location, Distance From Bottom, Inch | 3 | 3 | 3 | 3 | 3 |
| Overflow Vol., CC | 1391.9 | 1391.4 | 1340.9 | 1329.0 | 1355.2 |

All containers were grossly deformed and collapsed and were not acceptable.

It can be seen that in each instance the resultant container is grossly deformed and collapsed and would not be acceptable commercially. Additional tests have shown that comparable containers with substantial loss of definition occurs at lower heat setting temperatures where the mold opening delay and cooling time are the same.

It can thus be seen that it is essential that the application of carbon dioxide be continued after the mold has been opened in order to obtain satisfactory results.

The following TABLE D summarizes the properties obtained in typical examples of the container shown in FIGS. 5 and 6:

TABLE D

PROPERTIES OF INTERNALLY COOLED CONTAINERS
Heatset Temperature = 228° C.
Heatset Time = 5 sec.
$CO_2$ Time = 5 sec.

| MECHANICAL PROPERTIES | | AXIAL | HOOP |
|---|---|---|---|
| Elastic Modulus, kpsi | x̄ | 394 | 644 |
| | σ | 38 | 86 |
| Yield Stress, kpsi | x̄ | 14.9 | 27.3 |
| | σ | 0.5 | 0.9 |
| Yield Strain, % | x̄ | 6.3 | 6.0 |
| | σ | 0.2 | — |
| Ultimate Strength, kpsi | x̄ | 16.9 | 46.5 |
| | σ | 1.2 | 4.1 |
| Ultimate Elongation % | x̄ | 51 | 19 |
| | σ | 16 | 3 |
| DENSITY | | | |
| Density at 25° C., g/c.c. | | 1.3960 | |

It can thus be seen that the mechanical properties and improved density are satisfactory.

When inherent viscosity is referred to herein, it is the viscosity as measured in a 60/40 weight ratio phenol/-tetrachloroethane solution at 25° C. Density was determined by the method described by ASTM 1505, entitled "Density Gradient Technique".

The mechanical properties were measured as defined in ASTM standard D-638.

The following TABLE E shows the onset-of-shrinkage results. It can be seen that onset-of-shrinkage is substantially increased by the method for making the container shown in FIGS. 5 and 6 over the same container made without heat setting:

TABLE E

ONSET OF SHRINKAGE
Heatset Temperature = 228° C.
Heatset Time = 5 sec.
$CO_2$ Time = 5 sec.

| CONTAINER | ONSET OF SHRINKAGE, °C. |
|---|---|
| Heatset | 110° C. |
| Non-Heatset | 50° C. |

The onset-of-shrinkage temperature referred to herein was determined as described in Brady and Jabarin "Thermal Treatment of Cold-Formed Poly(Vinyl Chloride) Polymer Engineering and Science", pp. 686–90 of Vol. 17, No. 9, September 1977, except that the samples were cut from the sidewalls of the bottles. No thermal treatment was effected on the cut samples prior to the tests.

TABLE F shows the results of tests conducted at lower heat setting time.

TABLE F

| Bottle Number | 1F |
|---|---|
| Crystallization | |
| Temp, °C. | 225 |
| Time, Sec. | 3 |
| Bottom Temp, °C. | 132 |
| Mold Open Delay, Sec. | 2.5 |
| $CO_2$ On Time, Sec. | 3.5 |
| Nozzle Location, Distance From Bottom, Inch | 3½ |
| Overflow Vol., CC | 1490.0 |

It can be seen that satisfactory containers are obtained in accordance with the method at lower heat setting times.

It can be seen that there has been provided a method for making biaxially oriented heat set containers having a high onset-of-shrinkage temperature.

In various tests of the heat setting method embodying the invention, it has been found that the resultant container can be readily cooled to substantially below 100° C. and can be handled easily and touched by operators performing the method.

Observations made in accordance with the well known light scattering test indicate that containers made in accordance with the method appear to have more uniform crystalline size distribution in the body of the container than is obtained by prior known heat setting methods that require long periods of time to cool the container after heat setting. It is believed that this more uniform crystalline size distribution is due to rapid quenching or cooling achieved in accordance with the method.

The sequence of operation utilized in accordance with the method may be summarized as follows:

1. The parison is heated to the orientation temperature (90°-100° C.).
2. Parison is allowed to soak for a given period of time in order to equilibrate the inside and outside temperature.
3. The parison is transferred to the blow station.
4. The mold is closed.
5. The parison is blown and heat set for a given period of time.
6. The container is exhausted.
7. While the container is exhausting, the liquid $CO_2$ is introduced.
8. The mold is opened and $CO_2$ injection is continued.
9. $CO_2$ injection completed.
10. The container is unclamped and released.

In the case of containers having complex or free standing bottoms, a mold base is provided which remains in contact with the base of the container when the mold is opened and cooling fluid continues to be applied to the interior of the container while the base mold is in engagement with the base of the container. The movable mold base can be applied also to a hemispherical bottom container to stabilize the container while the mold is open and cooling fluid is being applied.

Accordingly, it can be seen that there has been provided a method and apparatus for making partially crystalline, biaxially oriented heat set hollow plastic containers wherein the containers have reduced post mold shrinkage, increased density, increased onset-of-shrinkage temperature, and satisfactory mechanical properties, which has a significantly lower cycle time; which permits heat set containers to be made that have complex configurations including oval containers; which involves low capital investment; which is easy to maintain; and which involves the use of lower cost tooling; and which can be adapted readily to conventional machine for making biaxially oriented containers.

I claim:

1. In a method for making a partially crystalline, biaxially oriented, heat set plastic container from a hollow polyethylene terephthalate parison having an open end and a closed end, comprising engaging the open end of the parison which is at a temperature within its molecular orientation temperature range, enclosing the parison in a hot mold, the mold being at heat-setting temperature of 180° C. to 230° C., expanding the parison to form the container within the blow mold by introducing a blow molding fluid within the parison, to induce biaxial orientation of the parison and force the parison into intimate contact with the blow mold, and to maintain contact of the parison with the blow mold by the internal pressure of the blow molding fluid for a time sufficient to induce partial crystallization of the plastic material, and further comprising the steps of: cooling the container with a cooling fluid that changes its state to cool by the latent heat of vaporization, the cooling fluid being selected from the group consisting of liquid carbondioxide, liquid nitrogen, and a combined mixture of water vapor and sub-zero temperature air, the cooling fluid having a positive pressure sufficient to allow the cooling fluid to change its state and to keep the container in contact with the heated mold, while at the same time exhausting the blow molding fluid with the hot mold closed, the cooling within the mold being for a time of 0.5 to 9.5 seconds until the average temperature of the container is reduced to a condition such that it will not expand under the positive pressure of the cooling fluid but would collapse in the absence of the positive pressure of the cooling fluid so that the positive pressure of the cooling fluid prevents the container from collapsing when the hot mold is opened, and continuing to cool the container while preventing the container from collapsing when the hot mold is opened with positive pressure of the cooling fluid until the container is self-sustaining.

2. A method as defined in claim 1 in which the cooling fluid is liquid carbon dioxide.

3. A method as defined in claim 1 in which the cooling fluid is liquid nitrogen.

4. A method as defined in claim 1 in which the cooling fluid is a combined mixture of water vapor and sub-zero temperature air.

5. A method for making a partially crystalline, biaxially oriented heat set hollow plastic container from a hollow parison having an open end and a closed end comprising engaging the open end of a poly(ethylene) terephthalate parison which is at a temperature within its molecular orientation temperature range ranging between 80° C. and 110° C., enclosing the hot parison in a hot mold, the mold being at heat setting temperature ranging between 180° C. and 230° C., expanding the plastic parison within the hot mold by internal pressurization to induce biaxial orientation of the plastic parison and force the plastic parison into intimate contact and conformance with the hot mold and to maintain contact between the mold and the biaxially oriented container for a time ranging between 0.5 and 10 seconds sufficient to induce partial crystallization in the biaxially oriented container and form a partially crystalline, biaxially oriented heat set container, thereafter exhausting the blow molding fluid while continuously introducing a cooling fluid into the interior of the biaxially oriented container, said cooling fluid being of a type which changes state to cool by the latent heat of vaporization when introduced into the mold and having a positive pressure, the cooling fluid being selected from the group consisting of liquid carbon dioxide, liquid nitrogen, and combined sub-zero temperature air and water mist, and the cooling fluid cooling the container from the interior while the container is held in contact with the hot mold by the positive pressure of the cooling fluid while the hot mold is closed for a time ranging between 0.5 to 9.5 seconds sufficient that the average temperature of the container is reduced until the container is in a condition such that it will not expand under the positive pressure of the cooling fluid and such that it would collapse in the absence of the positive pressure of the cooling fluid, the positive pressure of the cooling fluid preventing the container from collapsing when the hot mold is opened, and opening the hot mold after a time ranging between 0.5 and 9.5 seconds after introduction of cooling fluid into the container is begun and thereafter cooling the container under the positive pressure of the cooling fluid for a predetermined period of time to continue the cooling of the container from the interior until the container is cooled sufficiently to prevent significant shrinkage and is self sustaining.

6. The method set forth in claim 5 wherein the step of introducing a cooling fluid is achieved by a nozzle moved and positioned axially within the blown container such that cooling fluid is introduced to substantially all areas of the interior surface of the container.

7. The method set forth in claim 5 wherein the mold has a cavity defining a complex container.

8. The method set forth in claim 5 wherein the heat setting temperature ranges between 180° to 230° C., the heat setting time ranges between 1 and 5 seconds, the cooling time before the mold opens ranges between 0.5 and 5 seconds, the cooling time after mold opening ranges between 0.8 and 1.2 seconds.

9. The method set forth in claim 8 wherein the heat setting temperature is about 225° C. and the heat setting time is about 3 seconds.

10. The method set forth in claim 5 wherein the mold includes a partible mold and a separate mold base about which the partible mold is closed including the step of maintaining engagement between the mold base and the container after the hot mold is opened and while cooling fluid is continuously introduced and continuously removed from the container while the mold is open.

11. The method set forth in claim 10 wherein the mold has a cavity defining a complex container.

12. A method for making a partially crystalline, biaxially oriented heat set hollow plastic container from a hollow parison having an open end and a closed end comprising engaging the open end of a polyethylene terephthalate parison which is at a temperature within its molecular orientation temperature range, enclosing the hot parison in a partible hot mold having a separate mold base which is separate from the partible mold, the mold being at heat setting temperature of 180° C. to 230° C., expanding the plastic parison within the hot mold by internal pressurization to induce biaxial orientation of the plastic parison and force the plastic parison into intimate contact and conformance with the hot mold and to maintain contact between the mold and the biaxially oriented container for a time sufficient to induce partial crystallization in the biaxially oriented container and form a partially crystalline, biaxially oriented heat set container, exhausting the blow molding fluid while continuously introducing a cooling fluid into the interior of the biaxially oriented container, the cooling fluid being of a type which changes state when introduced into the mold, and having a positive pressure, and being selected from the group consisting of liquid carbon dioxide, liquid nitrogen, and combined sub-zero temperature air and water mist, and continuously exhausting the cooling fluid from the container to cool the container from the interior while the container is held in contact with the hot mold by the positive pressure while the hot mold is closed for a period of time sufficient that the average temperature of the container is reduced until the container is in a condition such that it will not expand under the positive pressure of the cooling fluid but would collapse in the absence of the positive pressure of the cooling fluid so that the positive pressure of the continuously flowing cooling fluid prevents the container from collapsing when the hot mold is opened, opening the hot mold and maintaining engagement of the mold base with the base of the container and thereafter continuing to cool the container from the inside while preventing the container from collapsing when the mold is opened with partial pressure of the cooling fluid until the container is self sustaining.

13. The method set forth in claim 12 wherein the step of introducing a cooling fluid is achieved by moving and positioning a nozzle axially within the blown container such that cooling fluid is introduced to substantially all areas of the interior surface of the container.

14. The method set forth in claim 12 wherein the heat setting temperature of the mold is about 225° C.

15. The method set forth in claim 12 wherein the cooling fluid comprises liquid carbon dioxide.

16. The method set forth in claim 12 wherein the mold has a cavity defining a complex container.

17. The method set forth in claim 12 wherein the method is performed within the following parameters:

| | |
|---|---|
| Orientation temperature | 80–110° C. |
| Heat setting time | 0.5–10 sec. |
| Total Cooling time | 1.0–10 sec. |
| Mold open delay | 0.5–9.5 sec. |

18. The method set forth in claim 17 wherein the heat setting temperature ranges between 180° and 230° C., the heat setting time ranges between 1 and 5 seconds, cooling time before the mold opens ranges between 0.5 and 5 seconds, and the cooling time after mold opening ranges between 0.8 and 1.2 seconds.

19. The method set forth in claim 18 wherein the heat setting temperature is about 225° C. and the heat setting time is about 3 seconds.

20. A method for making a partially crystalline, biaxially oriented heat set hollow plastic container from a hollow parison having an open end and a closed end comprising engaging the open end of a polyethylene terephthalate parison which is at a temperature within its molecular orientation temperature range, enclosing the hot parison in a hot mold, the mold being at heat setting temperature of 180° C. to 230° C., expanding the plastic parison within the hot mold by internal pressurization to induce biaxial orientation of the plastic parison and force the plastic parison into intimate contact and conformance with the hot mold and to maintain contact between the mold and the biaxially oriented container for a time sufficient to induce partial crystallization in the biaxially oriented container and form a partially crystalline, biaxially oriented heat set container, thereafter exhausting the blow molding fluid while continuously introducing a cooling fluid into the interior of the biaxially oriented container, the cooling fluid being of a type which changes state to cool by the latent heat of vaporization, the cooling fluid having a positive pressure when introduced into the mold and into the biaxially oriented container, the cooling fluid being selected from the group consisting of liquid carbon dioxide, liquid nitrogen and combined sub-zero temperature air and water mist, and the cooling fluid cooling the container from the interior while the container is held in contact with the hot mold by the positive pressure of the cooling fluid while the hot mold is closed for a period of time of 0.5 to 9.5 seconds until the average temperature of the container is reduced until the container is in a condition such that it will not expand under the positive pressure of the cooling fluid but would collapse in the absence of positive pressure of the cooling fluid, the positive pressure of the cooling fluid preventing the container from collapsing when the hot mold is opened, and opening the hot mold and thereafter cooling the container under the positive pressure of the cooling fluid for a predetermined period of time to cool the container from the interior until the container is cooled sufficiently to prevent significant shrinkage and to obtain a self sustaining container.

21. The method set forth in claim 20 wherein the step of introducing a cooling fluid is achieved by moving and positioning the nozzle axially within the blown container and directing the cooling fluid radially and axially outwardly such that cooling fluid is introduced to substantially all areas of the interior surface of the container.

22. The method set forth in claim 20 wherein the heat setting temperature of the mold is 200° C.

23. The method set forth in claim 20 wherein the mold has a cavity defining a complex container.

24. The method set forth in claim 20 wherein the mold includes a partible mold and a separate mold base about which the partible mold is closed including the step of maintaining engagement between the mold base and the container after the hot mold is opened and while cooling fluid is continuously introduced and continuously removed from the interior of the container while the mold is open.

25. The method set forth in claim 24 wherein the mold has a cavity defining a complex container.

26. The method set forth in claim 20 wherein the method is performed within the following parameters:

| Orientation temperature | 80–110° C. |
|---|---|
| Heat setting time | 0.5–10 sec. |
| Total Cooling time | 1.0–10 sec. |
| Mold open delay | 0.5–9.5 sec. |

27. The method set forth in claim 26 wherein the heat setting temperature ranges between 180° to 230° C., the heat setting time ranges between 1 and 5 seconds, cooling time before the mold opens ranges between 0.5 and 5 seconds, and the cooling after mold opening ranges between 0.8 and 1.2 seconds.

28. The method set forth in claim 27 wherein the heat setting temperature is about 225° C. and the heat setting time is about 3 seconds.

* * * * *